Jan. 15, 1935.  C. G. WERNMARK  1,987,809
MACHINE FOR OPERATING ON SOLES
Original Filed Aug. 18, 1930  5 Sheets-Sheet 1

Inventor:
Carl G. Wernmark,
By Townsend, Loftus & Abbett
Attorneys

Jan. 15, 1935. C. G. WERNMARK 1,987,809
MACHINE FOR OPERATING ON SOLES
Original Filed Aug. 18, 1930  5 Sheets-Sheet 3

Inventor.
Carl G. Wernmark,
By Townsend, Loftus & Abbett
Attorneys.

Patented Jan. 15, 1935

1,987,809

UNITED STATES PATENT OFFICE 1,987,809

MACHINE FOR OPERATING ON SOLES

Carl G. Wernmark, Hollywood, Calif., assignor to United Shoe Machinery Corporation, Paterson, N. J., a corporation of New Jersey Continuation of application Serial No. 476,072, August 18, 1930. This application May 12, 1933, Serial No. 670,762

20 Claims. (Cl. 12—17)

This invention relates to machines for performing one or more finishing operations on the perimeters of unattached shoe-soles. The invention is herein illustrated as embodied in an automatic machine provided with means for performing three successive finishing operations, viz., trimming the perimeter of a sole to final configuration, applying a finishing substance such as staining or coloring liquid to the trimmed perimeter, and burnishing or setting the perimeter, all without manual intervention after a sole to be finished has been placed in a suitable carrier. The illustrated machine is also provided with means for automatically discharging each sole from its carrier after it has undergone the final finishing operation.

In the manufacture of shoes of certain types, it is now common to secure outsoles thereto with adhesive cement, and to use soles that have been cut approximately to final configuration before they are attached, but to postpone the final edge-trimming, staining and burnishing of their perimeters until after attaching them. Nevertheless, it is in the interest of economy of manufacture to perform all the necessary or desired finishing operations on the soles by automatic machinery before attaching them, to the end that more rapid production may be obtained and no skill will be required for the finishing operations.

With these considerations in view, and in accordance with one aspect of the invention, the latter, as herein illustrated, is embodied in a machine comprising mechanism arranged to carry an unattached sole endwise in a plane parallel to its flat faces to and beyond an operating station, a rotary power-operated tool arranged at said station to operate on the perimeter of the sole station to operate on the perimeter of the sole first along one side thereof as the sole approaches the station, and mechanism arranged to reverse the sole end for end at the station in a direction to cause the operation of the tool to progress around one end of the sole and thence along the other side as the reversed sole moves beyond the station. Preferably, and as herein illustrated, the machine is provided with a rotary power-operated cutting tool arranged at one station and with a rotary power-operated burnishing tool arranged at another station to which each sole is carried successively and at each of which the sole is reversed end for end as above set forth.

Another feature of the invention consists in means arranged to apply a dressing substance such as a stain or coloring liquid to the perimeter of an unattached sole throughout its entire extent while the sole is in transit. Preferably, and as herein illustrated, the stain-applying means is arranged between the trimming station and the burnishing station, said means comprising a pair of appliers between which a sole may pass and receive the desired finishing substance without requiring any dwell or reversal of the sole incidental to applying the finishing substance thereto.

As herein illustrated, the machine is provided with a sole-conveying mechanism including a series of sole-carriers so spaced one from another that one of them will stand in cooperative relation to the burnishing station while another stands in corresponding relation to the trimming station, to the end that the burnishing operation may be performed on one sole while a trimming operation is being performed on another.

Still another feature of the invention consists in improved sole-carrying means including a templet by which the operation of the edge-trimming cutter may be automatically controlled to produce a trimmed perimeter of predetermined configuration. The invention also includes other improved features of construction and arrangement hereinafter described and claimed.

Referring to the drawings.

Figure 1:
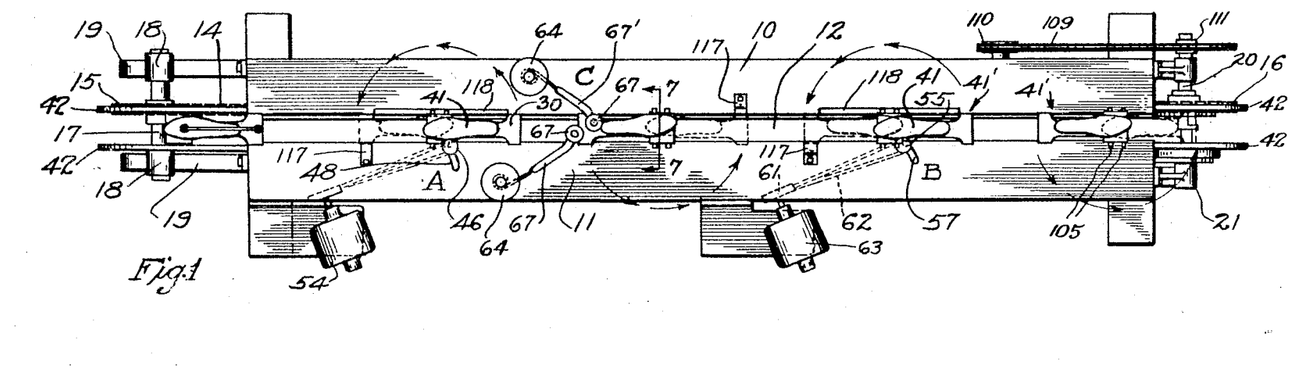
Fig. 1 is a top-plan view of a sole-finishing machine embodying the present invention.
Figure 2:
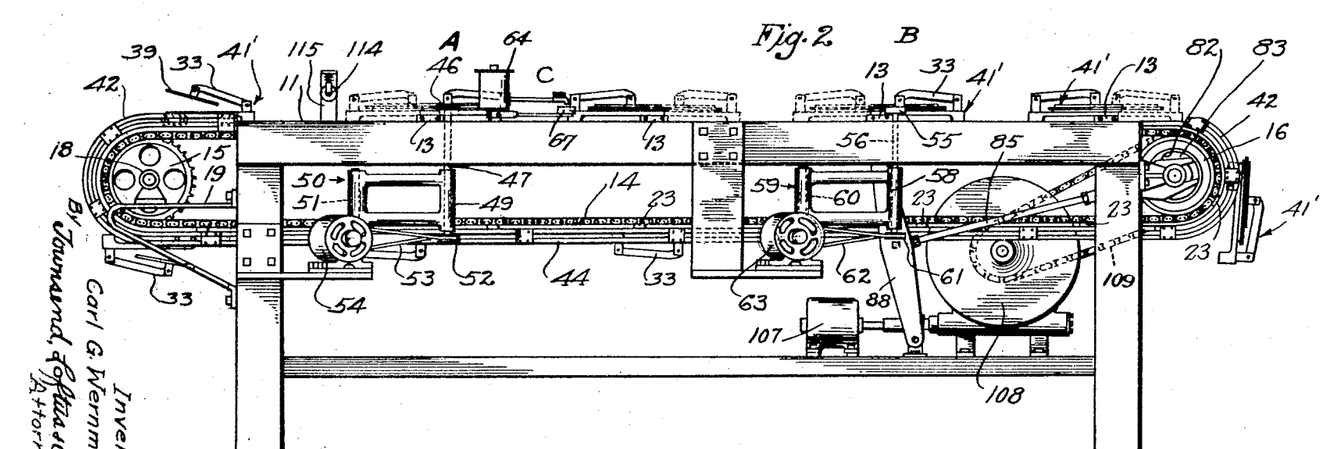
Fig. 2 is a side elevation thereof.
Figure 3:
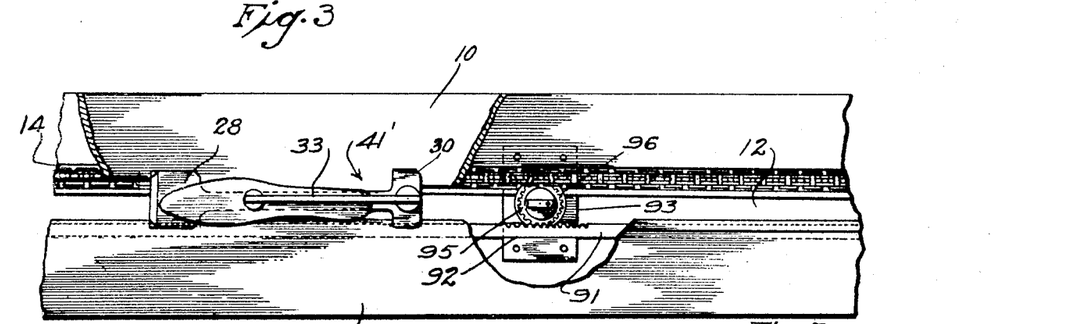
Fig. 3 is a top-plan view of a portion of the machine including one of a series of automatic mechanisms for reversing soles end for end at successive stations.

A preliminary outline of the principal motions will facilitate an understanding of the details to follow. Referring to Figs. 1 and 2, the operator stands at the left-hand end of the machine to place soles one by one in the sole-clamping units, of which a series are conveyed by a chain through an endless circuit starting at the work-receiving station, progressing therefrom along the top of the machine toward the opposite end thereof, thence around a curved track to a lower level and thence back to the work-receiving end where they are guided by another portion of curved track up to the work-receiving station. The travel of the conveyer chain and the sole-clamping units is interrupted momentarily at equidistant points, the design herein illustrated providing for eleven clamping units and eleven interruptions or dwells in the course of a complete circuit of travel, although the number of units, as well as the number of dwells, may be varied according to the number and kinds of operations to be performed on the soles, also according to the general organization of the machine. Nevertheless, whatever the number of dwells may be, the machine will be provided with a corresponding number of sole-clamping units, to the end that whenever a dwell occurs a sole-clamping unit will stand at the work-receiving station and at each of the operating stations.

In Fig. 1, a trimming station is indicated at A and an edge-setting or burnishing station is indicated at B. According to the illustrated organization, these stations are two steps apart, the intervening station intersected by line 7—7 being a point at which no operation is performed other than to turn the sole-clamping unit 180 degrees and thereby reverse the sole end for end so that the sole will arrive heel foremost at station B. Moreover, at the next station beyond B the work-clamping unit is again turned 180 degrees for no other purpose than to place it in the desired position for its arrival at the work-receiving station.

When the operator places an unattached sole in the clamping unit at the work-receiving station, he places it so that its heel-end will be toward the operating station A. During the brief dwell at station A, the sole-clamping unit is turned 180 degrees about a vertical axis at which point its heel-end describes an arc indicated by an arcuate series of arrows adjacent to that station. The sole is thus reversed end for end so that while it proceeds from station A to the next station at line 7—7 its toe-end will be in advance of its heel-end, but since this position of the sole is not desirable when the sole is about to arrive at station B another end-for-end reversal occurs at the station midway between A and B. Thus, in traveling from the work-receiving station at one end of the machine to the opposite end of the machine, each sole-clamping unit undergoes four successive half-turns at four successive stations, the direction of turning movement being the same in all cases.

Still referring to Figs. 1 and 2, C indicates the location of means for applying a finishing substance to the perimeter of each sole in transit from the operating station A to the next station of dwell at line 7—7. At point C, each sole travels toe foremost, but no necessity arises for interrupting the travel of the sole while the finishing substance is being applied thereto. Consequently, this point is not to be regarded as a station in the sense that the soles dwell in cooperative relation thereto.

Figure 7:
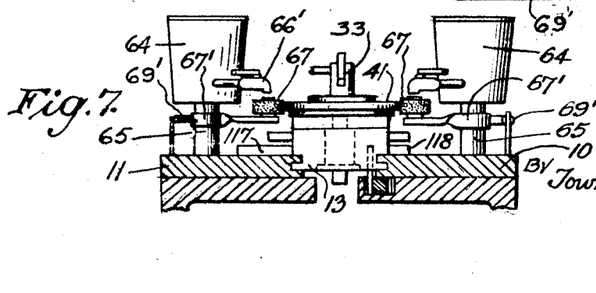
Fig. 7 is an elevation, partly in section, of the elements illustrated in Fig. 6 the point of view being indicated by line 7—7 in Fig. 1.
Figures 12, 13, 14, 15:
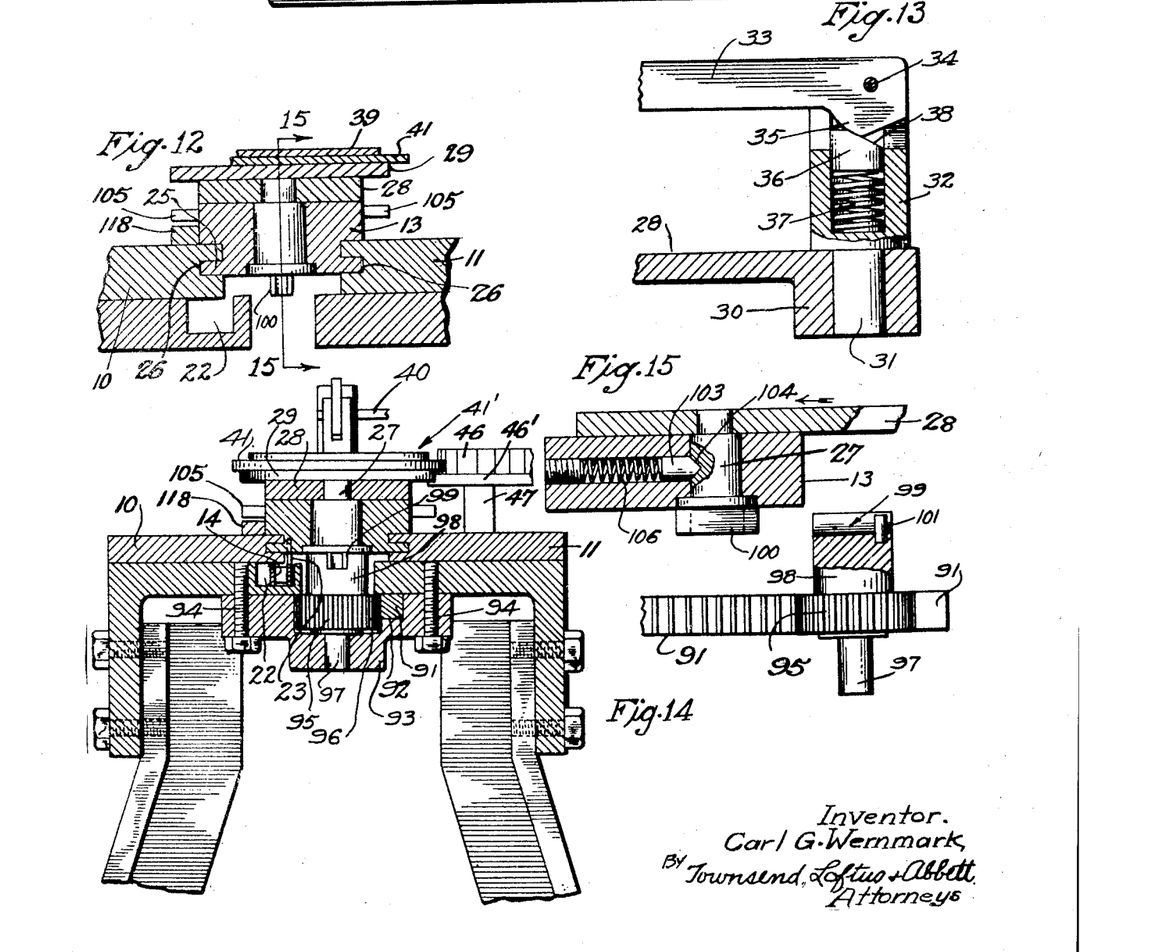
Fig. 12 is a vertical cross-section of the structure intersected by line 12—12 of Fig. 11.
Fig. 13 is an elevation, partly in section, of a portion of a sole-clamping unit.
Fig. 14 is a vertical cross-section through the upper portion of the machine at a point adjacent to the sole-trimming station.
Fig. 15 is a longitudinal section, partly in elevation, of the elements that are momentarily brought into cooperative relation at one of the sole-finishing stations to provide for reversing a sole end for end at the station.

The general frame structure of the illustrated machine resembles a table and comprises parallel horizontal rails or plates 10 and 11 spaced apart to form a slot or channel 12. As shown in Figs. 7, 12 and 14 the confronting edges of the rails 10 and 11 are provided with grooves 26 that constitute a track for guiding a series of carriages represented as blocks 13, the blocks being provided with tongues 25 arranged to slide in these grooves. Each carriage or block 13 carries a sole-clamping unit to be described. Moreover, each block is provided with a pair of rods or pins 105 extending crosswise thereof, the ends of which project laterally in the manner of trunnions. These pins have no function while the blocks are traveling along the rails 10 and 11, but when the blocks are about to pass beyond the right-hand ends of the rails 10 and 11 the projecting ends of the pins enter channels between two pairs of curved strips or rails 42 which constitute, in effect, continuations of the track by which the blocks are guided. Straight horizontal portions 44 forming extensions of the curved tracks 42 extend under the rails 10 and 11 to support the blocks and guide them back to the work-receiving end of the machine where another set of curved portions 42 (Figs. 2 and 8) lead the blocks to the upper level where the tongues 25 of the blocks will again enter the grooves 26 in the rails 10 and 11. Thus, the blocks are inverted at the right-hand end of the machine and are maintained in inverted position while returning along the track formed by the rails 44, to be again inverted while rising to the upper level. At a point under the work-receiving station the sole-clamping units are automatically opened to release and discharge the finished soles.

Figure 9:
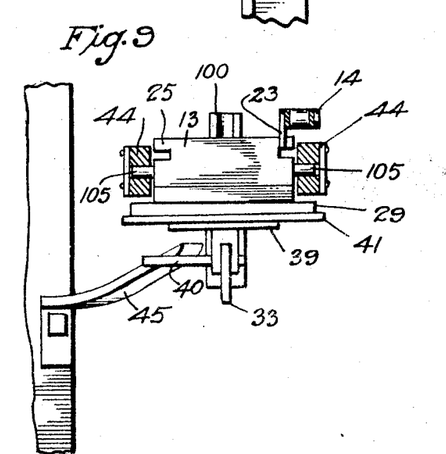
Fig. 9 is an elevation, partly in section, of the structure intersected by line 9—9 of Fig. 8.
Figure 10:
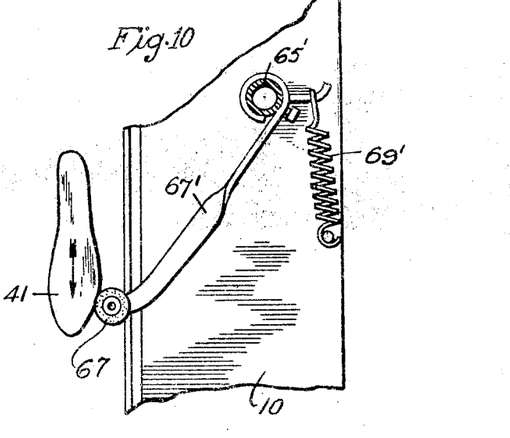
Fig. 10 is a top-plan view, partly in section, including one of the devices for applying a finishing substance to the perimeter of a sole.
Figures 16, 17:
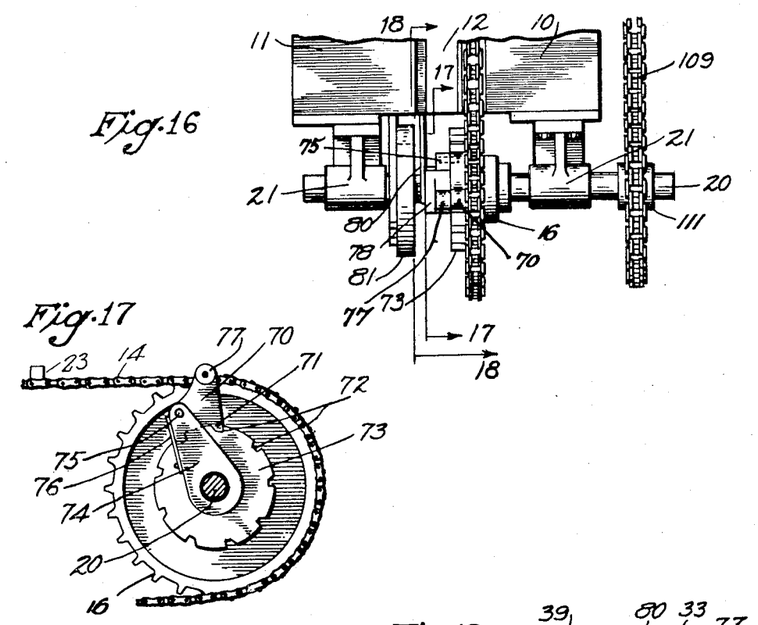
Fig. 16 is a top-plan view similar to Fig. 5 except that some elements are omitted to give a clearer view of others.
Fig. 17 is an elevation (see line 17—17 in Fig. 16) of mechanism for intermittently driving the conveyor chain by which the sole-clamping units are propelled through the machine.

The blocks or carriages 13 are propelled through their circuit of travel by an intermittently driven chain 14 arranged to run on an idle sprocket-wheel 15 at the work-receiving end of the machine and on a driven sprocket-wheel 16 at the opposite end. The upper stretch of this chain runs in a groove 22 (Figs. 7, 12 and 14) formed in the upper surface of the frame member upon which the guide rail 10 is secured. The blocks 13 are not connected to the chain but the propelling effect is obtained by providing certain links of the chain, at uniform intervals, with propelling lugs 23 (Figs. 9, 14 and 17). These lugs project upwardly from the upper stretch of the chain and abut the rear faces of the blocks 13. This feature of construction enables the operator to propel each sole-clamping unit manually to bring the unit to the work-receiving station in advance of the corresponding lug 23, such procedure being desirable to give the units periods of dwell at the work-receiving station longer than the periods of dwell of the conveyor chain. However, if the units are thus brought to the work-receiving station ahead of their normal periodicity their respective lugs 23 will overtake them in due course and carry them forward in accordance with their normal timed and spaced relation.

The sprocket-wheel 15 is affixed to a shaft 17 journaled in bearings 18 furnished by brackets 19 secured to the main frame structure of the machine. At the opposite end of the machine, the driven sprocket wheel 16 is supported by, but not affixed to, a continuously driven shaft 20, the latter being journaled in bearings 21. Mechanism hereinafter described is provided for automatically establishing and interrupting a driving connection between the shaft 20 and the sprocket-wheel 16, to the end that the latter will have suitable periods of rotation and short periods of dwell at regular intervals.

*Sole-clamping units*

Each block or carriage 13 is provided with a sole-clamping unit embodying the construction shown in Figs. 3, 8, 11, 12, 13, 14, and 15. One end of a clamping frame 28 lies upon the block 13 and is provided with a king-pin 27 extending downwardly through a bearing in the block and having an oblong head 100 at its lower end whereby the king-pin and the frame may be turned at each of the four stations where such turning movement is to occur as hereinbefore described. The other end of the frame 28 projects a considerable distance beyond the block 13 and is provided with a wide boss 30 arranged to bear upon the rails or plates 10 and 11. The upper surface of the frame 28 is flat and carries a clamping bed consisting of a templet 29 the perimeter of which is of a shape and size corresponding to but smaller than the desired perimeter of the soles to be finished. A relatively movable presser for clamping a sole-blank 41 against the templet 29 is connected to a post 31 rigidly secured in the boss 30 (Fig. 13) and projecting upwardly therefrom. The upper portion 32 of this post is provided with a vertical kerf occupied by a clamping arm 33 connected thereto by a horizontal pivot-pin 34. The portion 32 is bored vertically to provide a socket for a plug or follower 36 and a compression spring 37, the purpose of which is to maintain the arm 33 alternately in its clamping position and in a position of release. For this purpose the arm is provided with an ear 35 having a curved surface and a flat surface either of which may be moved into abutting relation with an inclined surface 38 of the plug 36. The outer end of the arm 33 carries a flat clamping plate 39 connected thereto by a pivot-pin 40, the plate 39 being thus adapted to tilt relatively to the arm 33 as may be necessary to insure a firm bearing on the clamped sole-blank. Sharp pointed spurs 116 (Fig. 8) project above the sole-engaging face of the templet 29 to indent the forepart and the heel-part of a clamped sole-blank and thereby prevent edgewise displacement of the blank while the clamp is closed thereon. The reference numerals 41' indicate the sole-clamping assemblages above described without particular reference to any individual element thereof.

Figure 8:
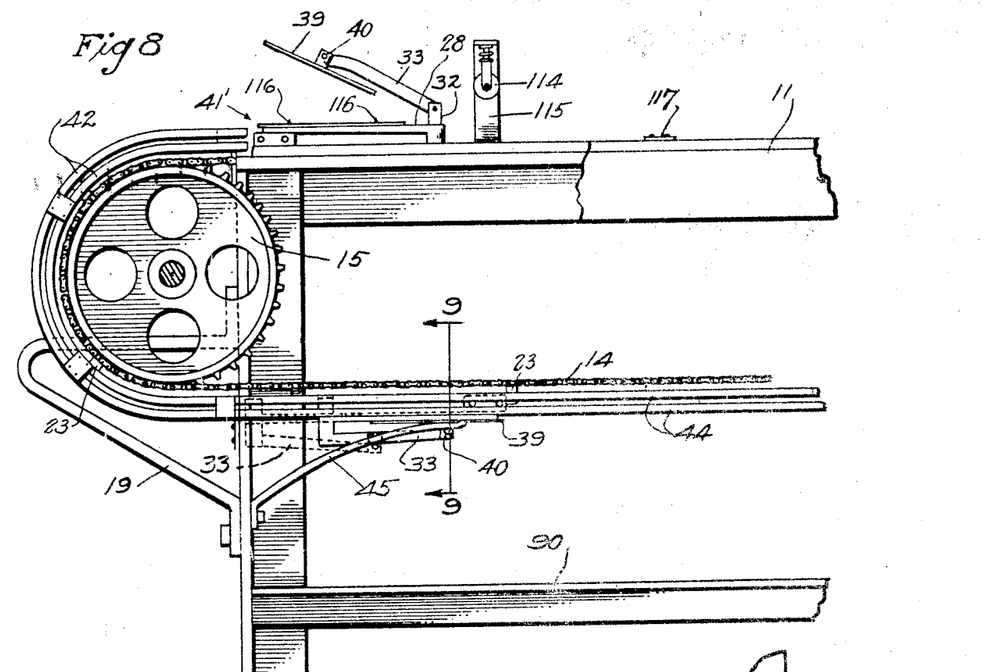
Fig. 8 is a side elevation of a portion of the machine at the left end of Fig. 2.

As shown in Figs. 2 and 8, a spring-pressed roll 114, supported by an overhanging bracket 115, is arranged between the work-receiving station and the first operating station A, the purpose of the roll being to depress the clamping arm 33 in case the operator fails to depress it manually before the sole-clamping unit is carried out of his range of manipulation, but even if the operator does depress the arm before the latter passes under the roll 114 the latter will nevertheless engage the arm and apply a supplemental clamping pressure.

*Sole-turning mechanism*

The first step of travel by which a sole-clamping unit is transferred from the work-receiving station to the first operating station A places the king-pin 27 substantially in coaxial relation to a vertical stud 98 of which the lower end 97 is journaled in a fixture 93 arranged below the rails 10 and 11 and secured to the frame of the machine by bolts 94 (see Fig. 14). A horizontal groove 99 extends diametrically across the upper end of the stud 98 to receive an oblong head 100 of the king-pin 27, the stud being thus adapted to operate in the capacity of a wrench to turn the king-pin and thereby turn the corresponding sole-clamping unit 41' about the axis of the king-pin. Three other studs of similar form are likewise arranged at the three next succeeding stations at which the sole-clamping units dwell momentarily during their travel along the upper level of the track, the second stud of the series being located at the point intersected by line 7—7 in Fig. 1, the third at station B and the fourth at the next station beyond B. These four studs 98 are each provided with a pinion 95 rigidly related to them, and the four pinions are all oscillated simultaneously through arcs of 180 degrees by a long rack-bar 91 (Fig. 3) arranged to slide in bearings 92 formed in the several supporting fixtures 93. The fixtures 93 are also provided with recesses 96 to receive the pinions 95. Suitable mechanism hereinafter described is provided to reciprocate the rack-bar 91 in timed relation to the movements and dwells of the conveyor-chain 14, the timing being such that during each period of dwell the rack-bar is moved away from the work-receiving station, but while the work-clamping units are advancing from station to station and are out of connection with the studs or wrenches 98 the rack-bar is moved in the opposite direction to its initial position. Thus, the mechanism just described is effective to turn the sole-clamping units during only the periods of dwell, the reverse turning of the studs 98 being merely for the purpose of placing them in the desired position to receive the next succeeding heads 100.

To prevent the king-pins 27 from overrunning the desired coaxial relation with the studs 98, the latter are provided with stops or abutments 101 that stand in the path of the heads 100 (see Fig. 15), the heads being provided with notches to receive the stops. According to this figure the direction of travel of the carriage 13 is indicated by an arrow 43, the relation of the parts indicating that the carriage is in an early stage of advancement from the station at which a dwell has occurred and at which the stud 98 has turned the king-pin 27 through an arc of 180 degrees. It will therefore be understood that although the stop 101 is at the right-hand side of the axis of the stud while the head 100 is being carried away from it, the stop stands initially at the left-hand side of the axis during the approach of the head to this station. Reverse turning of the studs 98 by the rack 91 occurs when the parts are in the relation shown in Fig. 15 or shortly thereafter, the essential consideration with respect to this motion being that it must occur while the heads 100 are disengaged from the studs.

To guard against accidental turning of the sole-clamping units between stations, and to insure alinement of the heads 100 with the grooves 99, the carriages 13 are provided with spring-pressed plugs or followers 103 backed by compression springs 106 and arranged to project their conical ends into conical recesses 104 formed in the peripheries of the king-pins. The surfaces of the recesses 104 act with a camming effect to force back the followers when the king-pins are turned by the studs 98.

Edge-trimming station

At station A (Figs. 1, 2 and 14) the machine is provided with automatic mechanism arranged to trim the peripheries of the clamped soles in accordance with the shapes of the templets 29. A rotary power-driven trimming cutter 46 and a circular disk 46' are both carried by a vertical shaft 47, the disk having a larger diameter than the cutter and being arranged to bear against a templet 29 while the cutter operates against the perimeter of the sole-blank 41 clamped upon the templet. As shown in Fig. 2, the shaft 47 is journaled in a sleeve or bearing 49 provided by a frame 50 located below the rail 11 of the table or track. The frame 50 is mounted upon a vertical post or spindle 51 about which it may swing to enable the disk 46' to follow the curvatures of the templets. Accordingly, the rail 11 (see Fig. 1) is provided with a slot 48 in which the cutter-shaft 47 may have a sufficient range of lateral movement toward and from the path along which the soles travel. Power for driving the cutter-shaft 47 at high speed may be obtained from an individual electric motor 54 and transmitted by a belt 53 from a pulley on the shaft of the motor to a pulley 52 on the cutter-shaft 47.

As each sole-clamping unit travels from the work-receiving station to the trimming station A, the clamped sole-blank 41 carried thereby lies heel foremost, the heel-end being thus presented first to the trimming cutter 46 which normally stands in lapped relation to its path. First, the post 32 will engage the disk 46', thereby displacing the cutter laterally, but the disk and the cutter will fall in behind the post to engage the templet and the sole respectively. Thereafter, the cutter will trim the periphery of the sole along one side while the clamping unit is approaching its position of dwell at that station.

Figure 11:
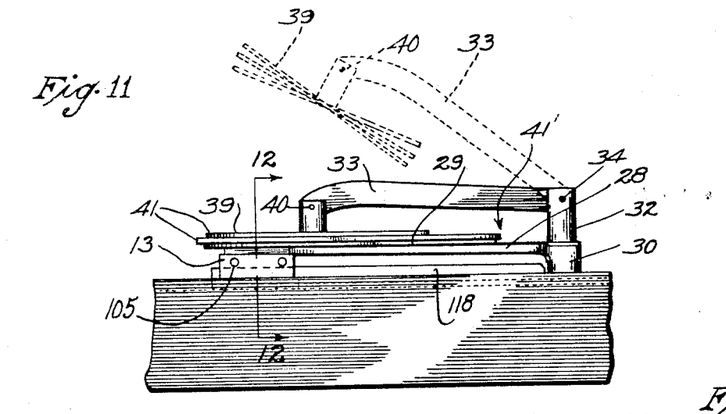
Fig. 11 is a side elevation of one of a series of traveling sole-clamping units.

During this first stage of trimming, the sole-clamping unit is braced against the lateral pressure of the cutter by a strip 118 (Figs. 1, 11 and 14) affixed to the rail 10 opposite the cutter. As shown in full lines in Fig. 1, the boss 30 on the leading end of the clamping bed or frame 28 (see also Fig. 11) is formed with laterally extending projections one of which runs in contact with the confronting straight face of the strip 118 to afford the bracing effect above mentioned, but this boss passes slightly beyond the bracing strip before the clamping unit reaches its position of dwell which is represented in Figs. 1 and 11. Having reached its position of dwell, the sole-clamping unit stands in coupled relation to the stud or wrench 98 by which it is to be turned 180 degrees to reverse the sole end for end. The rack-bar 91 now moves away from the work-receiving station, thereby turning the clamping unit to the position indicated by dotted lines at station A in Fig. 1, where the swinging movement of the boss 30 will be positively arrested by an abutment 117 bolted to the rail 11. It is to be observed in Figs. 11, 12 and 14 that the top surface of the bracing strip 118 is below the level of the pins 105 and that the projecting ends of the pins may override the strip without interference. It is also to be observed in Fig. 11 that the boss 30 has passed beyond the right-hand end of the strip 118 so that it, too, will clear the strip when rotational reversal of the clamping unit occurs. Moreover, the upper surface of the arresting abutment 117 is below the level of the pins 105 to provide clearance for the projecting ends of the latter.

While the clamping unit is being turned end for end at station A, the trimming of the sole progresses around the toe-end thereof to a point on the opposite side of the forepart, and when the turning movement has been arrested by the abutment 117 the clamping unit is in readiness for advancement to the next station or dwelling point. While the above-described motion of the clamping unit is occurring at station A, the clamping unit at station B undergoes a similar motion to maintain progress of another finishing operation at that station as hereinafter described.

Continuing the description of the operation at station A, immediately following the arresting of the clamping unit by the abutment 117 the clamping unit is carried forward to the next dwelling point (see line 7—7 of Fig. 1) by another step of travel of the conveyor-chain 14. During the first stages of this step of travel away from station A the trimming cutter 46 runs along the perimeter of the sole from the forepart toward the heel-end, thereby completing the trimming of the periphery and leaving the trimming cutter in a position to begin its operation on the next succeeding sole at the heel-end thereof.

After the clamping unit has passed out of control of the rotary stud or wrench 98 at station A, the latter and all the other similar members in the series are returned to their initial positions by a movement of the rack-bar 91 toward the work-receiving station, the members 98 being thereby placed in readiness to receive the heads 100 of the next succeeding clamping units.

Application of finishing substance

While a clamped sole is being transferred toe foremost from station A to the next succeeding point of dwell at line 7—7 in Fig. 1, it passes between and beyond a pair of absorbent rolls 67 which normally stand in its path, one slightly ahead of the other, so that each of them will engage the periphery of the sole initially at a point approximately in the longitudinal median line of the sole or at a point across the line from the side at which the supporting arm of the roll is mounted. As the sole advances it wedges the rolls apart and passes between them, the rolls being thus adapted to run along opposite sides of the perimeter of the sole toward the heel-end and thereby apply a finishing substance to all of the perimeter without any turning of the sole, the space between the heel-end of the sole and the post 32 (see Fig. 11) being of sufficient area to permit the rolls to enter successively and thereby apply the finishing substance to the heel-end, although the post itself will displace each roll as it passes.

Figure 6:
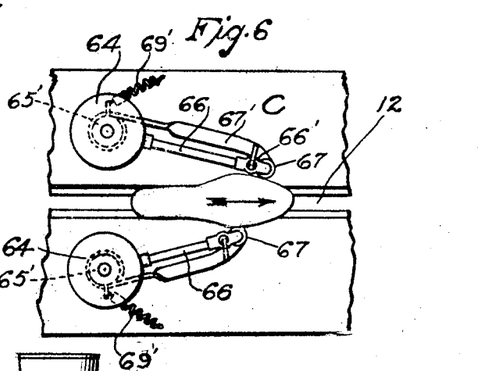
Fig. 6 is a top-plan view of that portion of the machine in the vicinity of the apparatus by which a finishing substance is applied to the trimmed perimeter of a sole.

A liquid finishing substance, such as a coloring stain, may be supplied to the rolls 67 from containers 64 (Figs. 6 and 7) mounted on supporting posts 65 arranged in bearings in the table. Pipes or spouts 66 conduct the liquid from the containers to outlet cocks 66' arranged above and in register with the rolls 67 respectively, the handles of the cocks being adapted to regulate the flow of liquid discharged upon the rolls. The rolls 67 are freely rotatable and are mounted upon the free ends of supporting arms 67'. The arms are secured to the supporting posts 65 and are capable of oscillating therewith. Springs 69' are connected to the arms 67' to maintain the rolls 67 normally in their operative positions and to cause them to follow the curvatures of the soles.

After the sole has passed the rolls 67, the clamping unit by which it is carried dwells at the station intersected by line 7—7 in Fig. 1, and during such dwell the clamping unit is again turned end for end as indicated by an arcuate series of arrows, its heel-end being thereby placed foremost (see dotted lines) where its rotational movement is again arrested by an abutment 117 bolted to the rail 10. From this position of dwell the clamping unit is carried forward to the next succeeding dwelling point at station B where another finishing operation may be performed.

*Edge-setting or burnishing*

The finishing station B may be provided with a rotary driven burnishing tool 55 arranged to operate on the previously trimmed and stained peripheries of the soles. The general organization of the apparatus for performing the burnishing operation may be similar to that of the apparatus for operating the trimming cutter at station A. As shown in Figs. 1 and 2, the burnishing tool 55 is attached to the upper end of a vertical shaft 56 that extends through a slot 57 in the plate or rail 11. Below this rail the shaft is journaled in a sleeve or bearing 58 forming a part of a frame 59. The frame is arranged on a post or spindle 60 about which it may swing within the limits of the slot 57 to enable the burnishing tool to follow the curvatures of the clamped soles. Rotation for operating the burnishing tool may be supplied by an electric motor 63 and transmitted by a belt 62 arranged to run on pulleys 61 affixed respectively to the shaft of the motor and to the shaft 56.

The perimeter of the sole along one side thereof is burnished by the tool 55 while the clamping unit is approaching its position of dwell at station B, the progress of the burnishing operation being from the heel-end toward the toe-end. When the clamping unit arrives at its position of dwell, the head 100 of its king-pin 27 lies in the groove 99 of the stud 98 at that station in accordance with the corresponding relation hereinbefore described in connection with the movements that occur at station A (Fig. 14). A second bracing strip 118 is affixed to the rail 10 at station B to brace the clamping unit against the operating pressure of the burnishing tool. Here also, the clamping unit is turned end for end, its leading end being thereby caused to swing, as previously described, in the direction indicated by an arcuate series of arrows until its boss 30 is arrested by an abutment 117 affixed to the rail 11. This swinging movement causes the burnishing operation to progress around the toe-end of the sole to a point on the opposite side of the forepart. Now the chain 14 advances another step, thereby carrying the clamping unit away from station B with the toe-end of the sole foremost. Again, when the clamping unit has advanced far enough to carry the head 100 of the king-pin 27 out of the groove 99, the several studs 98 are turned back to their initial positions by a movement of the rack-bar 91 toward the work-receiving station.

Since each sole-clamping unit stands toe foremost when leaving station B, it is desirable again to reverse it end for end so that it will stand heel foremost when it next arrives at the work-receiving station. Accordingly, at the next position of dwell beyond station B the machine is provided with a fourth stud 98 for this purpose, an arcuate series of arrows at the right-hand end of Fig. 1 indicating the arc of movement traversed by the heel-end of the unit in swinging from a trailing position (solid lines) to a leading position (dotted lines). When this swinging movement has been effected the clamping unit under consideration is in readiness to advance from the rails 10 and 11 to the curved track (rails 42) by which it is guided to the lower level and thence back to the opposite end of the machine at which the work-receiving station is located.

Although the clamping units dwell at successive points during the remainder of their cycle of travel, they remain heel-end foremost, no turning movement or finishing operation occurring while they are traveling along the lower level. Nevertheless, at a point preferably under the work-receiving station the machine is provided with means for automatically retracting the clamping arms 33 of the units to release the clamped soles so that they may be discharged by gravity and drop on the floor or into a receptacle placed thereon.

*Discharging means*

As shown in Fig. 9, the pin 40 projects from the clamping arm 33 so that it may be engaged and depressed by a stationary deflector 45 consisting of an arm bolted to the frame of the machine. When the clamping units arrive at this point they are inverted. Consequently, to effect the discharge of the clamped soles it is necessary only to depress the clamping plates 39. The outer end of the deflector 45 is inclined and intersects the normal path of travel of the pins 40 so that as each pin encounters the deflector while advancing under the propelling effect of the chain 14 the arm 33 and the clamping plate 39 will be depressed to release the finished sole. This movement of the arm (see Fig. 13) places the flat peripheral face of the ear 35 in contact with the flat face 38 of the spring-pressed plug 36. Thus the arm 33 of each clamping unit will be maintained in a retracted position while progressing from the discharging locality to the work-receiving station and the unit will be in readiness to receive another unfinished sole.

*Driving mechanism*

Figure 4:
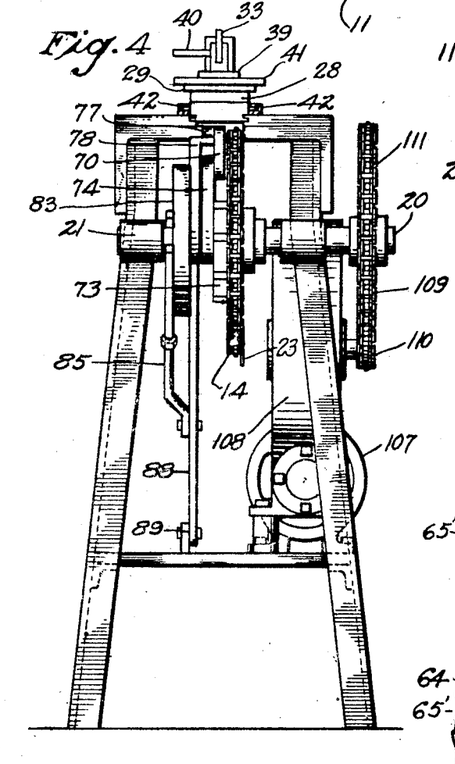
Fig. 4 is an end elevation of the end of the machine at the right of Figs. 1 and 2.
Figure 5:
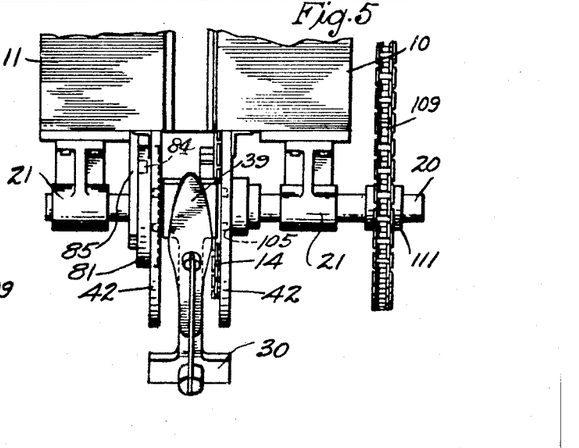
Fig. 5 is a top-plan view of the end of the machine illustrated in Fig. 4.
Figure 18:
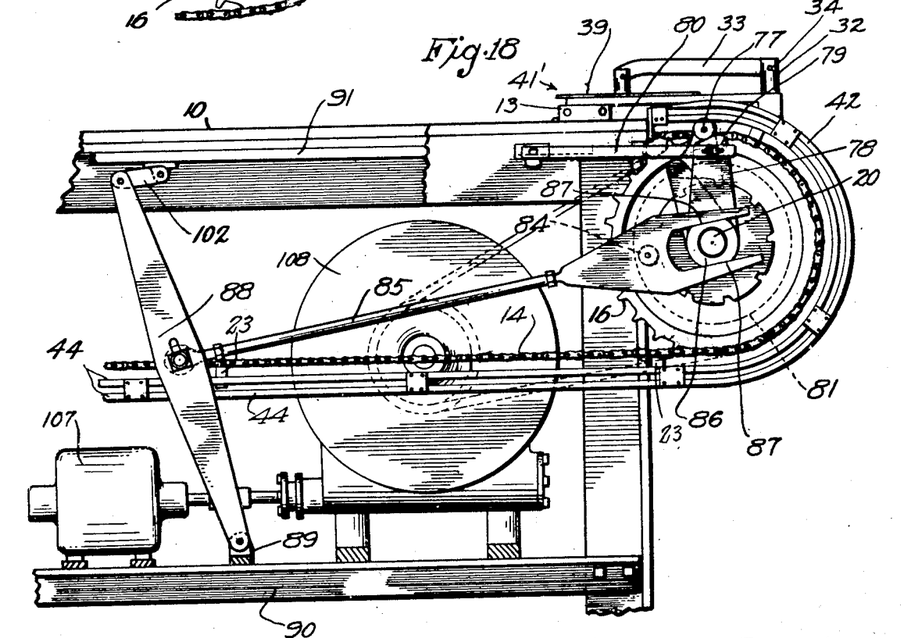
Fig. 18 is an elevation (see line 18—18 in Fig. 16) corresponding to the right-hand end of Fig. 2.

Disregarding the individual motors 54 and 63 for operating the trimming cutter 46 and the burnishing tool 55, the power for operating the machine may be furnished by an eletric motor 107 (Figs. 2, 4 and 18). As illustrated in these figures, the shaft of the motor 107 is connected to suitable reduction gearing represented conventionally by a gear-case 108. A continuously driven sprocket-wheel 110 outside the gear-case 108, but affixed to a slow-speed power-shaft journaled therein, is provided to drive a transmission-chain 109. This chain drives a sprocket-wheel 111 affixed to the shaft 20. Thus the shaft 20 is in continuous rotation so long as the motor 107 is in operation.

To reciprocate the rack-bar 91 at regular intervals, a cam-disk 81 is affixed to the shaft 20 and is provided with a cam-groove 82 (Fig. 2) in one of its faces 83. The groove 82 is occupied by a roll 84 (Fig. 18) mounted on a pitman 85 by which the cam-motion is communicated to a lever 88. The fulcrum of the lever is at its lower end and is furnished by a fixture 89 secured to a rail 90 of the frame structure. The upper end of the lever 88 is connected to the rack-bar 91 by a link 102. The end of the pitman 85 adjacent to the shaft 20 is forked to straddle a collar 86 through which the shaft extends loosely, the collar being provided with two parallel flat faces 87 for guiding the pitman.

*Intermittent motion for conveyor chain*

As hereinbefore stated, although the shaft 20 extends through and supports the sprocket-wheel 16 it is not directly connected thereto, the driving connection being intermittent and comprising the mechanism now to be described. Referring to Fig. 17, an arm 74 is affixed to the shaft 20 and rotates continuously therewith. This arm carries a driving dog or pawl 70 pivotally connected thereto by a pin or stud 75. A tooth or lug 71 formed on the pawl is arranged to engage the periphery of a disk 73 provided with a series of peripheral notches 72 equally spaced and each adapted to receive the lug. A leaf-spring 76 carried by the arm 74 engages the pawl 70 to maintain the lug 71 normally in one of the notches 72, thus establishing an operative driving connection between the shaft 20 and the disk 73. The disk is affixed to the sprocket-wheel 16 but is not affixed to the shaft. Consequently, whenever the lug 71 enters a notch 72 the sprocket-wheel 16 will be put into rotation to drive the conveyor-chain 14 and the entire series of carriages 13 on which the sole-clamping units are mounted.

To provide for periodic dwells of the conveyor-chain 14 during which the sole-clamping units are reversed end for end, the machine is provided with means for disengaging the pawl 70 from the disk 73 once in each cycle of the pawl about the axis of the shaft. As a result of such disengagement the disk 73 remains stationary through an interval during which the pawl overruns the disk until its lug 71 enters the next succeeding notch 72. During this interval the cam-groove 82 moves the rack-bar 91 away from the work-receiving station to reverse four of the work-clamping units end for end as described, and when such reversal has been completed the lug 71 of the pawl enters the next succeeding notch 72 and again puts the sprocket-wheel 16 into rotation. Thus, for each complete rotation of the cam 82 the sprocket-wheel 16 receives a rotational step less than 360 degrees, the other portion of the cycle corresponding to the period of time during which the lug 71 is over-running the disk 73.

For this purpose the pawl 70 is provided with a roll 77 arranged to ride over a stationary cam shown in Fig. 18. The effective surface of the cam is formed at the upper end of a member 78, the lower end of which has a bearing on the shaft 20 merely for support, the shaft having no driving connection with this member. The upper portion of the member 78 is clamped to a fixture 80 consisting of a bar bolted to the frame structure of the machine. A slot 79 formed in the bar 80 for the reception of the clamping bolt provides a short range of adjustment of the cam-member 78 to time its effect so that the periodic dwells of the sole-clamping units may be coordinated with the rotational movements by which they are reversed end for end. In running over the cam-member 78, the roll 77 lifts the lug 71 out of a notch 72, but before the lug has been carried into register with the next succeeding notch the roll 77 runs off the cam member. Thereupon the lug 71, now out of register with the notch from which it has just been lifted, drops upon the peripheral surface of the disk 73 and runs along this surface until it drops into the next notch.

Having thus described my invention, what I claim as new and desire to secure by Letters Patent of the United States is:

1. A machine for operating on soles comprising mechanism arranged to carry an unattached sole endwise in a plane parallel to its flat faces, a rotary power-operated tool arranged to operate on the perimeter of the sole first along one side thereof as the sole is carried past it in said plane, and mechanism arranged to reverse the sole edgewise end for end in a direction to cause the operation of said tool to progress around one end of the sole and thence along the other side as the reversed sole moves endwise from the reversing locality.

2. A machine for operating on soles comprising mechanism arranged to carry an unattached sole endwise to and beyond an operating station with a dwell at said station, mechanism arranged to reverse the sole edgewise end for end during the dwell at said station, and a rotary power-operated tool arranged at said station to operate on the perimeter of the sole first along one side thereof as the sole approaches said station, around one end of the sole during the reversing thereof, and along the other side as the sole moves away from said station.

3. A machine for operating on soles comprising mechanism arranged to carry an unattached sole endwise to and beyond a trimming station and a burnishing station successively, mechanisms arranged to reverse the sole edgewise end for end at each of said stations whereby the leading end, as the sole approaches each station, will become the trailing end as the sole moves away from the station, a power-operated edge-trimming tool at said trimming station, and a power-operated burnishing tool at said burnishing station, each of said tools being laterally movable and arranged to operate on the perimeter of the sole from end to end along one side, thence around the latter end, and thence along the other side to the first said end as the sole moves away from the station.

4. A machine for operating on soles comprising mechanism arranged to carry an unattached sole edgewise past a trimming station and a burnishing station successively, mechanisms arranged to rotate the sole edgewise end for end at each of said stations, a power-operated edge-trimming tool at said trimming station, a power-operated burnishing tool at said burnishing station, each of said tools being laterally movable and arranged to operate progressively around the perimeter of the sole including both sides and both ends thereof, and means arranged to apply a dressing substance to the perimeter of the sole in transit from said trimming station toward said burnishing station.

5. A machine for operating on soles comprising power-operated mechanism including a templet and a clamping device for carrying an unattached sole edgewise past a series of operating stations, a rotary power-operated edge-trimming cutter arranged to operate on the perimeter of the sole as the latter approaches and moves away from one of said stations, a templet-follower combined with said cutter, mechanism arranged to turn said templet and the clamped sole end for end while said cutter is operating, and means arranged to apply a dressing substance to the perimeter of the trimmed sole while the latter is between said stations.

6. A machine for operating on soles comprising power-operated mechanism including a templet and a clamping device for carrying an unattached sole edgewise past a series of operating stations, a rotary power-operated edge-trimming cutter arranged to operate on the perimeter of the sole as the latter approaches and moves away from one of said stations, a templet-follower combined with said cutter, mechanism arranged to turn said templet and the clamped sole end for end while said cutter is operating, a pair of laterally movable devices arranged to apply a dressing substance to the perimeter along the opposite sides of the sole while the latter is moving endwise between stations, and means for supplying the dressing substance to said devices.

7. A machine for operating on unattached soles, comprising means for clamping an unattached sole by its flat faces, mechanism for conveying said means, edgewise of a sole clamped therein, past a trimming station and a burnishing station successively with a dwell at each of them, a power-operated edge-trimming cutter arranged to operate on the perimeter of the sole at said trimming station, a power-operated burnishing tool arranged to operate on said perimeter at said burnishing station, mechanisms arranged to rotate said clamping means at each of said stations, and means arranged to apply a dressing substance to the perimeter of the sole between said trimming station and said burnishing station.

8. A machine for finishing the edges of unattached soles, comprising a sole-clamping device including a flat templet and a complemental member between and by which an unattached sole may be clamped, a power-operated edge-trimming cutter and a templet-follower combined therewith, a power-operated burnishing tool spaced laterally from said cutter, means for conveying said sole-clamping device past said cutter and said tool successively but with a dwell while in cooperative relation to each of them, means for rotating said sole-clamping device during each of said dwells, and means arranged to apply a dressing substance to the perimeter of the clamped sole in transit from said cutter toward said burnishing tool.

9. A machine for operating on soles, comprising a yieldable power-operated edge-trimming cutter, a rotatable unit including a templet and means for clamping an unattached sole against it, power-operated mechanism for moving said unit bodily to feed a clamped sole edgewise along said cutter, mechanism arranged to turn said unit about its axis of rotation while the cutter is operating on the sole, and means combined with said cutter to engage said templet and thereby control the trimming of the sole.

10. A machine for operating on soles, comprising a yieldable power-operated edge-trimming cutter, a rotatable unit including a templet and means for clamping an unattached sole against it, power-operated mechanism for moving said unit bodily with a dwell to feed first one side and thereafter the other side of the perimeter of the sole along said cutter, mechanism arranged to turn said unit and thereby reverse the sole end for end during said dwell while said cutter operates on an end of the sole, and means combined with the cutter to engage said templet and thereby control the trimming of the sole.

11. A machine for operating on shoe-parts, comprising a rotatable member the axis of which is stationary, a rotatable work-holder, power-operated mechanism by which said work-holder is carried to and from coaxial relation to said member, said work-holder and said member having cooperative coupling portions formed to be coupled and uncoupled by movement of the work-holder to and from said coaxial relation, a power-operated device arranged to perform an operation on a shoe-part secured to said work-holder while the latter and said member are in coupled relation, and automatic mechanism for rotating said member while said operation on the shoe-part is being performed.

12. A machine for operating on soles, comprising a rotatable member the axis of which is stationary, a rotatable sole-clamping unit, power-operated mechanism by which said unit is carried to and from a station in coaxial relation to said member, said unit and said member having cooperative coupling portions formed to be coupled and uncoupled by movement of the unit to and from said station, a power-operated tool arranged to operate on a clamped sole at said station, and automatic mechanism arranged to rotate said member while said unit is in coupled relation thereto.

13. A machine for operating on soles, comprising a rotatable member the axis of which is stationary, a rotatable sole-clamping unit, power-operated mechanism by which said unit is carried to and beyond a station in coaxial relation to said member, said unit and said member having cooperative coupling portions arranged to be coupled and uncoupled by the movement of travel of the unit, power-operated means arranged to operate on the perimeter of a clamped sole traveling past said station, and automatic mechanism arranged to rotate said member while said unit is coupled thereto.

14. A machine for operating on soles, comprising a series of rotatable members the axes of which are spaced apart laterally and stationary, a series of rotatable sole-clamping units likewise spaced apart, power-operated mechanism by which said units are carried successively past stations in coaxial relation to said members, said units and said members having cooperative coupling portions formed to be coupled and uncoupled by the movement of travel of the units, power-operated tools arranged adjacent to a plurality of said stations respectively to operate on soles carried past them by said units, and automatic mechanism by which said members are periodically rotated while the units are in coupled relation to them.

15. A machine for operating on soles, comprising a series of power-operated devices arranged at successive operating stations to perform finishing operations on the perimeters of unattached soles, a series of clamping units each adapted to clamp an unattached sole by its flat faces, automatic mechanism arranged to convey said clamping units past said devices successively and thereby feed the perimeters of the soles along said devices, and automatic mechanism arranged to turn said units 180 degrees at each of said stations while said devices are operating on ends of the soles.

16. A machine for operating on soles, comprising a power-operated trimming cutter and a power-operated burnishing device arranged at successive operating stations to operate on the perimeters of unattached soles, a series of clamping units each adapted to clamp an unattached sole by its flat faces, automatic mechanism arranged to convey said clamping units past said cutter and said burnishing device successively and thereby feed the perimeters of the soles along them, and automatic mechanism arranged to turn said units 180 degrees at each of said stations while the trimming operation and the burnishing operation progress around ends of the soles.

17. A machine for operating on soles comprising a power-operated trimming cutter, a power-operated burnishing tool, a clamping unit for clamping an unattached sole by its flat faces, power-operated mechanism for carrying said unit so that the perimeter of a sole clamped therein will run lengthwise in contact with said cutter and said tool successively, and power-operated mechanism arranged to turn said unit and thereby reverse the clamped sole end for end while the cutter is operating thereon and again while the burnishing tool is operating thereon.

18. A machine for operating on soles, comprising a series of individualy rotatable clamping units equally spaced laterally one from another and each adapted to clamp an unattached sole, power-operated mechanism by which said units are carried in an endless circuit successively past correspondingly spaced stations with dwells at said stations, power-operated means arranged to trim the perimeters of clamped soles approaching and leaving one of said stations, power-operated means arranged to burnish the perimeters of clamped soles approaching and leaving a subsequent station, automatic mechanism by which said units are turned successively with half-rotations while dwelling at said trimming station and at said burnishing station, and means by which a dressing substance is applied to the perimeters of the soles between the two stations last mentioned.

19. A machine for operating on soles comprising a movable sole-clamping unit including a clamping bed, a relatively movable presser, and means arranged to maintain said presser in sole-clamping position and in a retracted position as the case may be, mechanism by which said unit is transferred from a work-receiving station to another station, means arranged between said stations to impart clamping movement to said presser while said unit is moving toward said other station, and means arranged to operate on the sole at said other station.

20. A machine for operating on soles, comprising a series of movable sole-clamping units each including a clamping bed, a relatively movable presser and means arranged to maintain the presser in sole-clamping position and in a retracted position as the case may be, power-operated mechanism by which said units are propelled through an endless circuit, means arranged to perform an operation on the clamped soles carried by said units, means arranged to impart clamping movement to the pressers successively at a point of approach to the locality where said operation is performed, and means arranged to retract said pressers successively to release the soles at a point beyond said locality.

CARL G. WERNMARK.